United States Patent Office — 3,478,066, Patented Nov. 11, 1969

3,478,066
16α,17α-DIFLUOROMETHYLENE DERIVATIVES OF THE PREGNANE SERIES
Colin C. Beard, Boulder, Colo., and Alexander D. Cross, Mexico City, Mexico, assignors to Syntex Corporation, Panama, Panama, a corporation of Panama
No Drawing. Continuation-in-part of application Ser. No. 571,428, Sept. 23, 1966. This application July 21, 1967, Ser. No. 655,001
Int. Cl. C07c *169/30, 169/34;* A61k *27/00*
U.S. Cl. 260—397.3   20 Claims

ABSTRACT OF THE DISCLOSURE

16α,17α-difluoromethylene pregnanes and 19-nor pregnanes substituted at C–3 with a keto group, a hydroxy group or an ester thereof, optionally substituted at C–6 with a fluoro, chloro or methyl group, at C–16 with methyl and at C–21 with fluoro, and optionally unsaturated between C–1,2 and/or C–6,7 are progestational agents.

---

This is a continuation-in-part of co-pending application No. 581,428 filed Sept. 23, 1966, now abandoned, which is a continuation-in-part of application No. 486,266 filed Sept. 9, 1965, now U.S. Patent 3,338,928.

This invention relates to cyclopentanophenanthrene derivatives.

Specifically this invention pertains to substituted 16α,17α-difluoromethylene derivatives of the pregnane series which may be represented by the formula:

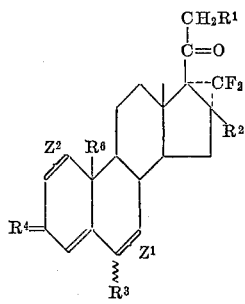

wherein each of $Z^1$ and $Z^2$ is a carbon-carbon single bond or a carbon-carbon double bond; $R^1$ is hydrogen or fluoro; $R^2$ is hydrogen or methyl; $R^3$ is hydrogen, 6α-methyl, 6α- or 6β-chloro, or 6α- or 6β-fluoro; $R^4$ is oxygen or the group

where $R^5$ is hydroxy, a conventional hydrolyzable ester, tetrahydrofuran-2′-yloxy or tetrahydropyran-2′-yloxy and; $R^6$ is hydrogen or methyl, $R^6$ being methyl when $Z^2$ is a carbon-carbon double bond.

The term "conventional hydrolyzable ester" as used herein denotes those hydrolyzable ester groups conventionally employed in the steroid art, preferably those derived from hydrocarbon carboxylic acids or phosphoric acids and their salts. The term "hydrocarbon carboxylic acid" defines both substituted and unsubstituted hydrocarbon carboxylic acids. These acids can be completely saturated or possess varying degrees of unsaturation (including aromatic), can be of straight chain, branched chain, or cyclic structure, and preferably contain from 1 to 12 carbon atoms. In addition, they can be substituted by functional groups, for example, hydroxy, alkoxy containing up to 6 carbon atoms, acyloxy containing up to 12 carbon atoms, nitro, amino, halogeno, and the like, attached to the hydrocarbon backbone chain. Typical conventional hydrolyzable esters thus included within the scope of the term and the instant invention are acetate, propionate, butyrate, valerate, caproate, enanthate, caprylate, pelargonate, acrylate, undecenoate, phenoxyacetate, benzoate, phenylacetate, diphenylacetate, diethylacetate, trimethylacetate, t-butylacetate, trimethylhexanoate, methylneopentylacetate, cyclohexylacetate, cyclophentylpropionate, adamantoate, glycolate, methoxyacetate, hemisuccinate, hemiadipate, hemi-β,β-dimethylglutarate, acetoxyacetate, 2-chloro-4-nitrobenzoate, aminoacetate, diethylaminoacetate, piperidinoacetate, β-chloropropionate, trichloroacetate, β-chlorobutyrate, dihydrogen phosphate, dibenzyl phosphate, benzyl hydrogen phosphate, sodium benzyl phosphate, cyclohexylammonium benzyl phosphate, sodium phenyl phosphate, sodium ethyl phosphate, di-p-nitrobenzyl phosphate, sodium o-methoxyphenyl phosphate, cyclohexylammonium p-cyanobenzyl phosphate, sodium phenacyl phosphate, benzyl o-carbomethoxyphenyl phosphate, and the like.

The novel compounds of the present invention possess progestational activity, and accordingly are thus useful in fertility control, the management of dysmenorrhea, the treatment of uterine bleeding, and like conditions in which progestational agents are employed. The compounds of the present invention can be administered by the known pharmacological routes, such as orally, parenterally, or the like. The dosage unit will depend upon factors such as the type of condition being treated, and the like. Generally, a dose of about 0.002 to about 0.33 mg. per kilogram of body weight is employed. The compounds are given in conventional forms, such as pills, powders, pellets, syrups, solutions, suspensions, capsules, and the like.

The novel 16α,17α-difluoromethylene steroids of the present invention can be prepared from the corresponding 20-keto-Δ¹⁶ steroids by a novel process that can be illustrated by the following reaction sequence:

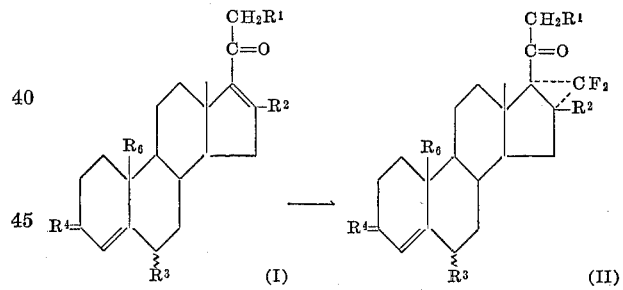

wherein $R^1$, $R^2$, $R^3$, $R^4$, and $R^6$ are defined as hereinbefore.

The novel 16α,17α-difluoromethylene steroids are prepared by treating the corresponding 20-keto-Δ¹⁶ steroid with at least a molar equivalent, preferably an amount greater than a molar equivalent, of a difluoro acid salt. The difluoro acid salt is an alkali metal or an alkaline earth metal salt of an acid of the formula $WCF_2COOH$, wherein W is chloro, bromo, or iodo. Suitable difluoro acid salts include sodium chlorodifluoroacetate, potassium iododifluoroacetate, calcium chlorodifluoroacetate, and the like, sodium chlorodifluoroacetate being the preferred reagent.

The above principal process is conducted at a temperature sufficient at least to decompose the reagent. The decomposition is evidenced by the evolution of carbon dioxide. When sodium chlorodifluoroacetate is employed, the reaction is carried out at temperatures from about 150° C. to about 180° C., preferably above 160° C. The reaction period will be dependent upon the reaction conditions. However, the reaction period is generally from about 30 minutes to about 6 hours. The reaction may be followed by ultraviolet spectroscopy to completion. The process is carried out in an inert, non-aqueous, preferably anhydrous, polar organic solvent or mixture of such solvents. Typical solvents include ethers, such as dimethyl diethyleneglycol ether (diglyme), 1,2-dimethoxy ethane, dimethyl triethyleneglycol either (triglyme), and the like; dialkyl sulfoxides, such as dimethylsulfoxide; dialkyl hydrocarbon carboxylic acid amides, such as dimethylformamide, dimethyl acetamide, and the like.

The novel $16\alpha,17\alpha$-difluoromethylene steroids are isolated by conventional techniques known to the art. For example, the reaction mixture is filtered, and then evaporated to dryness; the residue is taken up in methylene chloride and chromatographed on alumina.

During the principal process, free hydroxy groups present on the starting material can be esterified. However, these esterified hydroxy groups can be regenerated by hydrolysis, such as with methanolic potassium hydroxide, after the principal process. Alternatively, the hydroxy groups can be protected prior to the process by esterification to a conventional hydrolyzable ester group, or by etherification to an ether group by conventional techniques known to the steroid art.

During the principal process, other unsaturation besides the $\Delta^{16}$ unsaturation will participate in reactions with the reagent. Therefore, such other unsaturation is protected prior to the principal process. For example, a $\Delta^5$ steroid may be specifically chlorinated to produce the corresponding $5\alpha,6\beta$-dichloro steroid, which can be dehalogenated after the principal process back to the $\Delta^5$ steroid. Preferably, the dehalogenation is conducted with zinc and acetic acid.

The starting steroids, that is, the 20-keto-$\Delta^{16}$ steroids of Formula I, are known in the art or are prepared by conventional techniques known to the art. For example, the 16-methyl-$\Delta^{16}$ configuration is introduced by first treating a 3,20-bis-semicarbazone-$17\alpha$-hydroxy steroid with a mixture of acetic anhydride and glacial acetic acid and then with pyruvic acid to obtain the corresponding 3,20-diketo-$\Delta^{16}$ steroid. The latter is treated with diazo methane to obtain the corresponding 16,17-pyrazoline steroid. The corresponding 16-methyl-$\Delta^{16}$ steroid is obtained upon pyrolyizing the latter.

The 3-keto-$\Delta^4$ steroids are prepared from the corresponding 3-keto-$\Delta^5$ steroid by treating the latter with isopropoxide. Alternatively the $\Delta^4$ unsaturation can be introduced into the novel $16\alpha,17\alpha$-difluoromethylene steroids at the completion of the principal process. For example, a 3-keto-$16\alpha,17\alpha$-difluoromethylene-$5\beta$-steroid is brominated to obtain the corresponding 4-bromo steroid; the latter upon treatment with lithium chloride is dehalogenated to yield the corresponding 3-keto-$\Delta^4$-$16\alpha,17\alpha$-difluoromethylene steroid. By treating the latter compound with chloranil the corresponding 3-keto-$\Delta^{4,6}$-$16\alpha,17\alpha$-difluoromethylene steroid is obtained. By treating the 3-keto-$\Delta^4$ steroid with 2,3-dichloro-5,6-dicyano-1,4-benzoquinone, the corresponding 3-keto-$\Delta^{1,4}$ steroid is obtained.

The 6-fluoro steroids are prepared by treating 3-ethoxy-$\Delta^{3,5}$-steroids with perchloryl fluoride. 3-ethoxy-$\Delta^{3,5}$-steroids are prepared from the corresponding 3-keto-$\Delta^4$-steroids by etherification with ethylorthoformate. The 6-chloro steroids are prepared by treating the corresponding 3-ethoxy-$\Delta^{3,5}$-steroids with N-chlorosuccinimide. The 21-fluoro steroids are prepared by brominating the corresponding 20-keto steroids to obtain the corresponding 20-keto-21-bromo steroids, which are treated with sodium iodide to obtain the 20-keto-21-iodo steroids. The latter are treated with silver fluoride to obtain the 21-fluoro steroids.

$3\beta$-hydroxy steroids are prepared from the corresponding 3-keto steroids by treating the latter with a reducing reagent such as lithium aluminum hydride, sodium borohydride, and the like. Preferably, the reduction is carried out with sodium borohydride and anhydrous isopropanyl.

The hydroxy groups can be esterified with such reagents as hydrocarbon carboxylic acid anhydrides, hydrocarbon carboxylic chlorides, hydrocarbon carboxylic acids, and so forth, in the appropriate solvent and in the presence of an acid catalyst.

The $3\beta$-(tetrahydrofuran-2'-yloxy) and $3\beta$-(tetrahydropyran-2'-yloxy) steroids are prepared by treating a $3\beta$-hydroxy steroid with either dihydrofuran or dihydropyran respectively in the presence of an acid catalyst.

The 3-phosphoric acid esters are prepared by treating a 3-iodo steroid with the silver salt of phosphoric acid or a derivative thereof at reflux. The 3-iodo steroid is prepared from the correseponding 3-hydroxy steroid by treating the latter with red phosphorous and iodine.

Typical $16\alpha,17\alpha$-difluoromethylene steroids include:

$16\alpha,17\alpha$-difluoromethylenepregn-4-ene-3,20-dione;
$16\alpha,17\alpha$-difluoromethylene-19-nor-pregn-4-ene-3,20-dione;
$16\alpha,17\alpha$-difluoromethylene-$16\beta$-methylpregn-4-ene-3,20-dione;
$16\alpha,17\alpha$-difluoromethylene-$16\beta$-methyl-19-norpregn-4-ene-3,20-dione;
$16\alpha,17\alpha$-difluoromethylene-$16\beta$-methyl-21-fluoropregna-1,4,6-triene-3,20-dione;
6-methyl-$16\alpha,17\alpha$-difluoromethylene-19-norpregna-4,6-diene-3,20-dione;
$3\beta$-hydroxy 6,16$\beta$-dimethyl-$16\alpha,17\alpha$-difluoromethylene-19-norpregna-4,6-dien-20-one phosphoric acid ester;
6,21-difluoro-$16\alpha,17\alpha$-difluoromethylene-19-norpregna-4,6-diene-3,20-dione;
6-chloro-$16\alpha,17\alpha$-difluoromethylene-19-norpregna-4,6-diene-3,20-dione;
6-chloro-$16\alpha,17\alpha$-difluoromethylene-$16\beta$-methylpregna-1,4,6-triene-3,20-dione;
$3\beta$-(tetrahydropyran-2'-yloxy)-6-chloro-$16\alpha,17\alpha$-difluoromethylene-$16\beta$-methyl-19-norpregna-4,6-dien-20-one.

In order that those skilled in the art can more fully understand the present invention, the following examples are included. These examples are intended merely to illustrate and in no way should they be construed as a limitation of the present invention.

PREPARATION I

One gram of $17\alpha$-hydroxy-19-norpregnane-3,20-dione is treated with 1.4 g. of semicarbazide hydrochloride in 30 ml. of methanol containing 1 ml. of water and 0.74 g. of sodium bicarbonate. The mixture is refluxed for 3 hours and then maintained at 45° C. for an additional 20 hours while under a nitrogen atmosphere. Fifty milliliters of water are added, and the 3,20-bis-semicarbazone-19-norpregnan-$17\alpha$-ol is collected by filtration. After it is vacuum dried at room temperature, it is dissolved in a solution of 20 ml. of acetic acid and 1 ml. of acetic anhydride and heated at reflux under nitrogen for 1 hour. The reaction mixture is then concentrated under reduced pressure to a volume of about 12 ml. and treated with 6 ml. of water and 3 ml. of pyruvic acid. The mixture is allowed to stand at room temperature for 40 hours and at 60° C. for 2 hours and is then diluted with water and extracted with chloroform. These extracts are washed with water, a dilute aqueous potassium bicarbonate solution and water, dried over magnesium sulfate and evaporated to dryness under reduced pressure. The resulting 19-nor-pregn-16-ene-3,20-dione is dissolved in 10 ml. of ether, and a 10 ml. saturated ether solution of diazomethane is cautiously added to it. The mixture is allowed to stand for 24 hours and then 1 milliliter of glacial acetic acid is slowly added. The mixture is evaporated to dryness under reduced pressure. The residue is gradually heated to 180° C. in vacuo, yielding 16-methyl-19-norpregn-16-ene-3,20-dione which is further purified by recrystallization from acetone:hexane.

PREPARATION II

A stirred solution of 8 g. of $3\beta$-acetoxy-6,16-dimethyl-19-norpregna-5,16-diene-20-one in 100 ml. of chloroform containing a few drops of pyridine is cooled to 0° C. and slowly treated with a cooled solution of 1.05 molar equivalents of chlorine in chloroform. The mixture is allowed to reach room temperature and is then flushed with dry air. The mixture is next washed with 5% aqueous sodium bicarbonate solution and with water, dried over sodium sulfate and evaporated to dryness to yield 3β-acetoxy-5α,6β - dichloro - 6α,16-dimethyl - 19 - norpregn-16-en-20-one which is recrystallized from methanol:benzene.

EXAMPLE I

To a stirred solution of 19 g. of 3β-acetoxy-5β-pregn-16-en-20-one in 10 ml. of dimethyl diethylene glycol ether, heated at reflux is added in a dropwise fashion a 1:2 w./v. solution of sodium chlorodifluoroacetate in the same solvent. When the U.V. spectra shows no change upon the addition of 5 additional equivalents of reagent, the refluxing is discontinued and the mixture is filtered and evaporated to dryness. The residue is chromatographed on alumina eluting with methylene chloride to yield 3β - acetoxy-16α,17α-difluoromethylene-5β-pregnan-20-one; M.P. 193.5–194° C., $[\alpha]_D = +73°$.

EXAMPLE II

To a stirred and refluxing solution of 1 g. of pregn-16-ene-3,20-dione in 8 ml. of dimethyl diethyleneglycol ether is added in a dropwise fashion over a 2-hour period, a solution of 30 molar equivalents of sodium chlorodifluoroacetate in 30 ml. of dimethyl diethyleneglycol ether. At the end of the reaction period, which may be followed by the U.V. spectra, the mixture is filtered and evaporated in vacuo to dryness. The residue is added to a 10% methanolic potassium hydroxide solution and this mixture is heated briefly at reflux and then poured into ice water. The solid which forms is collected, washed with water, dried and chromatographed on alumina, eluting with methylene chloride, to yield 16α,17α-difluoromethylenepregnane-3,20-dione.

Similarly, 16α,17α-difluoromethylene-19-norpregnane-3,20 - dione, 16α,17α-difluoromethylene-16β-methylpregnane-3,20-dione, 16α,17α-difluoromethylene-16β-methyl-19-norpregnane-3,20-dione are prepared from the corresponding Δ$^{16}$-steroids.

EXAMPLE III

To a stirred and refluxing solution of 1 g. of 3β-acetoxy 5α,6β - dichloro-6α,16-dimethyl-19-norpregn-16-en-20-one in 10 ml. of dimethyl triethylene glycol ether, is added in a dropwise fashion and under nitrogen, a 50% w./v. solution of sodium chlorodifluoroacetate in the same solvent. When the addition of 5 equivalents of reagent fails to produce an appreciable change in the U.V. spectrum, the addition is stopped The solution is cooled and filtered and the filtrate is evaporated to dryness under reduced pressure. The residue thus obtained is chromatographed on alumina, eluting with methylene chloride, to yield 3β - acetoxy-5α,6β-dichloro-6α,16β-dimethyl-16α,17α-difluoromethylene-19-norpregnan-20-one.

By this procedure, other Δ$^{16}$-steroids can be produced into 6α - substituted-16α,17α-difluoromethylene steroids. For example, 3β - acetoxy-5α,6β-dichloropregn-16-en-20-one and 3β-acetoxy-5α,6β-dichloro-6α-methylpregn-16-en-20-one can be converted into 3β-acetoxy-5α,6β-dichloro-16α,17α-difluoromethylenepregnan-20-one and 3β-acetoxy-5α,6β-dichloro - 6α - methyl-16α,17α-difluoromethylene-pregnan-20-one.

A mixture of 5 g. of 3β-acetoxy-5α,6β-dichloro-6α,16β-dimethyl - 16α,17α-difluoromethylene-19-norpregnan-20-one, 5 g. of zinc dust and 125 ml. of glacial acetic acid is heated at 90° C., for 1 hour and then filtered through Celite diatomaceous earth. The filtrate is concentrated to a small volume under reduced pressure, cooled and diluted with ice water. The solid which forms is collected by filtration and dried to yield 3β-acetoxy-6α,16β-dimethyl-16α,17α-difluoromethylene - 19-norpregn-5-en-20-one which is recrystallized from acetone:hexane.

By the same process, 3β-acetoxy-5α,6β-dichloro-6α-methyl-16α,17α - difluoromethylene-19-norpregnan-20-one is converted to 3β-acetoxy-6α-methyl-16α,17α-difluoromethylene-19-norpregn-5-ene-20-one and so forth.

EXAMPLE IV

A solution of 1 g. of 3-acetoxy-6,16β-dimethyl-16α,17α-difluoromethylenepregn-5-en-20-one in 50 ml. of methanol is heated at reflux for 3 hours with a solution of 5% potassium hydroxide in 1 ml. of water. The reaction mixture is then poured into ice water and the solid which forms is collected by filtration, washed with water to neutrality, and dried to yield 3-hydroxy-6,16β-dimethyl-16α,17α-difluoromethylenepregn-5-en-20-one which is recrystallized from methylene chloride:ether.

The product is placed in a solution of 80 ml. of toluene and 20 ml. of cyclohexanone and the resulting mixture is dried by removing 10 ml. of solvent by distillation. A solution of 1 g. of aluminum isopropoxide in 7 ml. of anhydrous toluene is then added and the mixture refluxed for 45 minutes. Four milliliters of acetic acid are added and the solvents removed by steam distillation. The residue is extracted several times with ethyl acetate and these extracts are then washed with 5% hydrochloric acid solution, water, 10% sodium carbonate solution and water to neutrality, dried over anhydrous sodium sulfate and evaporated to dryness to yield 6α,16β-dimethyl-16α,17α-difluoromethylenepregn-4-ene-3,20-dione which may be further purified by recrystallization from acetone:hexane.

In the same manner, other 3-acyloxy or hydroxy-Δ$^5$-steroids can be converted into 3-keto-Δ$^4$-steroids. For example, 3-acetoxy-6α,16β-dimethyl-16α,17α-difluoromethylene-21-fluoro-19-norpregn-5-en-20-one is converted into 6α,16β-dimethyl-16α,17α-difluoromethylene-21-fluoro - 19-norpregn-4-ene-3,20-dione.

EXAMPLE V

Over a 10-minute period, a solution of 1.1 molar equivalents of bromine and 2.45 g. of sodium acetate in 110 ml. of glacial acetic acid is added to a stirred mixture of 1 g. 16α,17α-difluoromethylenepregnane-3,20-dione and 6.6 g. of p-toluenesulfonic acid in 330 ml. of glacial acetic acid. After stirring for an additional 10-minute period, a solution of 75 g. of sodium acetate in 150 ml. of glacial acetic acid is added and stirring is then continued at 20° C. for 5 minutes. The reaction mixture is next poured into 1 liter of ice water and the solid which forms is collected and dissolved in methylene chloride. This solution is washed with water, dilute sodium bicarbonate solution and water, dried and evaporated to dryness. The residue is dissolved in 60 ml. of dimethylformamide and added to a well stirred suspension of 12.5 g. of calcium carbonate in 440 ml. to dimethylacetamide, heated at reflux. Refluxing is continued for 45 minutes, and the mixture is then filtered and concentrated to about 60 ml. under reduced pressure. After the addition of 5 ml. of hexane, the mixture is filtered and the filtrate is evaporated to dryness. This residue is chromatographed on acid washed alumina with a 3:1 benzene: chloroform solution to yield 16α,17α-difluoromethylenepregn-4-ene-3,20-dione which may be recrystallized from cyclohexane:ethyl acetate.

In the same manner, other 3-keto-Δ$^4$-steroids may be produced from the corresponding 3-keto-steroids. For example, 16β-methyl-16α,17α - difluoromethylene-19-norpregn-4-ene-3,20-dione, 16α,17α - difluoromethylene-19-norpregn-4-ene-3,20-dione and 16α,17α-difluoromethylene-16β-methylpregn-4-ene-3,20-dione are produced from the corresponding 3-keto-steroids.

EXAMPLE VI

To a suspension of 1 g. of 16α,17α-difluoromethylene-16β-methylpregn-4-ene-3,20-dione in 7.5 ml. of anhydrous, peroxide-free dioxane are added 1.2 ml. of freshly distilled ethyl orthoformate and 0.8 g. of p-toluenesulfonic acid. The mixture is stirred at room temperature for 30 minutes. There is then added 0.8 ml. of pyridine, followed by water until solidification occurs. This solid is collected by filtration, washed with water and air dried to yield 16α,17α-difluoromethylene-3-ethoxy-16β-methylpregna-3,5-diene-3,20-dione which is recrystallized from acetone:hexane. The steroid and 0.4 g. of anhydrous sodium acetate are dissolved in a mixture of 20 ml. of acetone and 32 ml. of water. The solution is cooled to 5° C. and 1.1 molar equivalents of N-chlorosuccinimide and 0.4 ml. of glacial acetic acid are added. The mixture for 30 minutes at the same temperature and then diluted with water. After being allowed to stand at 0° C. for 15 hours, the solid is collected by filtration, washed with water and dried under vacuum to yield 16α,17α-difluoromethylene-6β-chloro-16β-methylpregn-4-ene-3,20-dione which is recrystallized from acetone. The corresponding 6α-chloro compound is obtained by dissolving this compound in glacial acetic acid and introducing a slow stream of anhydrous hydrogen chloride over a period of 4 hours at a temperature of 15° C. The solid which forms upon pouring this mixture into water is collected by filtration, washed with water and dried to yield 6α-chloro-16α,17α-difluoromethylene-16β-methylpregn-4-ene-3,20-dione which is recrystallized from acetone:hexane.

16α,17α - difluoromethylene - 6α-chloro-16β-methyl-19-norpregn-4-ene-3,20-dione, 16α,17α-difluoromethylene-6α-chloro-19-norpregn-4-ene-3,20 - dione, 16α,17α-difluoromethylene-6α-chloropregn-4-ene-3,20-dione and the like are produced in the same manner from the corresponding 3-keto-Δ⁴-steroid.

EXAMPLE VII

One gram of 3-ethoxy-16α,17α-difluoromethylene-16β-methylpregna-3,5-dien-20-one, which is prepared from 16α,17α - difluoromethylene-16β-methylpregn-4-ene-3,20-dione by the method described in Example VI, placed in 25 ml. of dimethylformamide, and cooled to 0° C. A stream of perchloryl fluoride is passed through the solution for a period of 5 minutes, while the temperature is maintained at 0° C. After being allowed to slowly attain a temperature of 20° C., the solution is poured into water and extracted with ethyl acetate. These extracts are washed with saturated aqueous sodium bicarbonate solution and with water to neutrality, dried over sodium sulfate and evaporated to dryness. The residue is then chromatographed on alumina to separate the 6α-fluoro and 6β-fluoro isomers. The latter, which predominates, is dissolved in 50 ml. of glacial acetic acid saturated with hydrogen chloride, and the resulting mixture is allowed to stand for 24 hours at a temperature of 15° C. The mixture is poured into cold water, and the solid which forms is collected by filtration, washed with water and dried to yield 6α-fluoro-16α,17α-difluoromethylene-16β-methylpregn-4-ene-3,20-dione which is recrystallized from acetone:hexane.

By this procedure, other 6α-fluoro-Δ⁴-steroids can be produced from the corresponding 3-keto-Δ⁴-steroid. For example, 6α-fluoro-16α,17α - difluoromethylenepregn-4-ene-3,20-dione is produced from 16α,17α-difluoromethylenepregn-4-ene-3,20-dione and 6α,21-difluoro-16α,17α-difluoromethylene-19-norpregn-4-ene-3,20-dione is produced from 21-fluoro-16α,17α-difluoromethylene-19-norpregn-4-ene-3,20-dione.

EXAMPLE VIII

One gram of 16α,17α-difluoromethylene-6α-chloro-16β-methylpregn-4-ene-3,20-dione and 2 g. of chloranil in 50 ml. of t-butanol are heated at reflux for 8 hours. The cooled reaction mixture is filtered and the solid which separates is washed with a large volume of ethyl acetate. The combined filtrate and washings are in turn washed with cold 10% aqueous sodium hydroxide until the washings are colorless, dried over sodium sulfate and evaporated to dryness to yield 16α,17α-difluoromethylene-6-chloro-16β-methylpregna-4,6-diene-3,20 - dione which may be further purified through clarification with alumina and recrystallization from methylene chloride:ether.

By the use of this procedure, the 3-keto-Δ⁴-ene steroids of Examples V, VI, and VII can be converted into the corresponding 3-keto-Δ⁴,⁶-diene steroids. For example, the Δ⁴,⁶-steroids listed under column II are obtained from the Δ⁴-steroids listed respectively under column I.

| I | II |
| --- | --- |
| 6α-methyl-16α-difluoromethylene-19-norpregn-4-ene-3,20-dione. | 6-methyl-16α,17α-difluoromethylene-19-norpregna-4,6-diene-3,20-dione. |
| 6α,16β-dimethyl-16α,17α-difluoromethylenepregn-4-ene-3,20-dione. | 6,16β-dimethyl-16α,17α-difluoromethylenepregna-4,6-diene-3,20-dione. |
| 16α,16β-dimethyl-16α,17α-difluoromethylene-19-norpregn-4-ene-3,20-dione. | 6,16β-dimethyl-16α,17α-difluoromethylene-19-norpregna-4,6-diene-3,20-dione. |
| 16α,17α-difluoromethylenepregn-4-ene-3,20-dione. | 16α,17α-difluoromethylenepregna-4,6-diene-3,20-dione. |
| 6α-chloro-16α,17α-difluoromethylene-19-norpregn-4-ene-3,20-dione. | 6-chloro-16α,17α-difluoromethylene-19-norpregna-4,6-diene-3,20-dione. |
| 6α-chloro-16α,17α-difluoromethylene-16β-methyl-19-norpregn-4-ene-3,20-dione. | 6-chloro-16α,17α-difluoromethylene-16β-methyl-19-norpregna-4,6-diene-3,20-dione. |
| 6α-chloro-16α-difluoromethylenepregn-4-ene-3,20-dione. | 6-chloro-16α,17α-difluoromethylene-pregna-4,6-diene-3,10-dione. |
| 6α-chloro-16α,17α-difluoromethylene-16β-methyl-19-norpregn-4-ene-3,20-dione. | 6-chloro-16α,17α-difluoromethylene-16β-methyl-19-norpregna-4,6-diene-3,20-dione. |
| 6α-chloro-16α,17α-difluoromethylenepregn-4-ene-3,20-dione. | 6-chloro-16α,17α-difluoromethylene-pregna-4,6-diene-3,20-dione. |
| 6α-fluoro-16α,17α-difluoromethylene-16β-methylpregn-4-ene-3,20-dione. | 6-fluoro-16α,17α-difluoromethylene-16β-methylpregna-4,6-diene-3,20-dione. |
| 6α-fluoro-16α,17α-difluoromethylene-16β-methyl-19-norpregn-4-ene-3,20-dione. | 6-fluoro-16α,17α-difluoromethylene-16β-methyl-19-norpregna-4,6-diene-3,20-dione. |
| 6α-fluoro-16α,17α-difluoromethylene-19-norpregn-4-ene-3,20-dione. | 6-fluoro-16α,17α-difluoromethylene-19-norpregna-4,6-diene-3,20-dione. |

EXAMPLE IX

A mixture of 0.5 g. of 16α,17α-difluoromethylenepregn-4-ene-3,20-dione, 10 ml. of dioxane and 0.35 g. of 2,3-dichloro-5,6-dicyano-1,4-benzoquinone is refluxed for 10 hours. The mixture is then cooled, filtered and evaporated to dryness. The residue is dissolved in acetone and this solution is then filtered through 10 g. of alumina and concentrated to yield 16α,17α-difluoromethylenepregna-1,4-diene-3,20-dione which is further purified by recrystallization from acetone:hexane.

By utilizing the same procedure, other 3-keto-Δ⁴-steroids can be transformed into 3-keto-Δ¹,⁴-steroids such as 6α-chloro-16α,17α-difluoromethylenepregna-1,4-diene-3,20-dione; 6α - methyl-16α,17α-difluoromethylenepregna-1,4 - diene - 3,20 - dione; 6α,21-difluoro-16α,17α-difluoromethylenepregna-1,4-diene-3,20-dione, and so forth.

By using 16α,17α-difluoromethylenepregna-4,6-diene-3,20-dione as the starting material in this procedure, the 16α,17α - difluoromethylenepregna - 1,4,6 - triene - 3,20-dione is obtained. Other 3-keto-Δ⁴,⁶-steroids of Example VIII can be produced into 3-keto-Δ¹,⁴,⁶-steroids by the method of this procedure. For example 6-chloro-16α,17α-difluoromethylenepregna-1,4,6-triene - 3,20 - dione is obtained from the 6-chloro-16α,17α-difluoromethylenepregna-4,6-diene-3,20-dione.

EXAMPLE X

One gram of 6α-chloro-16α,17α-difluoromethylene-19-norpregn-4-ene-3,20-dione is added to a solution of 7.5 ml. of tretrahydrofuran and 4.5 ml. of methanol. The resulting mixture is cooled to 10° C. in an ice bath. One and one-half grams of calcium oxide and 1.5 g. iodine are added to the mixture in 0.1 g. portions while maintaining the temperature at 10° C. The mixture is then stirred, and it is allowed to rise to room temperature; stirring is continued until the solution becomes a pale yellow color. The mixture is poured into a solution of 10 g. of ice, 4.5 ml. of glacial acetic acid and 0.5 g. of sodium thiosulfate and stirred for one-quarter hour. The solid which forms is collected by decantation and it is washed with water until the washings are neutral. The solid is then dried under vacuum at room temperature to yield 6α-chloro-16α,17α-difluoromethylene-21-iodo-19-norpregn-4-ene-3,20 - dione which is purified by recrystallization from acetone:hexane. The steroid is dried under vacuum.

One gram of 6α-chloro-16α,17α-difluoromethylene-21-iodo-19-norpregn-4-ene-3,20-dione is added to 6 ml. of acetonitrile, and the resulting mixture is treated dropwise with 0.24 g. of silver fluoride in 1 ml. of water. The mixture is allowed to stand at room temperature for 24 hours and then filtered. The filtrate is concentrated under vacuum at room temperature and the solid which forms is collected and dried at 25° C. to yield 6α-chloro-16α,17α-difluoromethylene-21-fluoro-19-norpregn-4 - ene-3,20-dione which is recrystallized from methanol:acetate.

Similarly, 16α,17α-difluoromethylene-21-fluoropregna-4,6-diene-3,20-dione is obtained from 16α,17α-difluoromethylenepregna-4,6-diene-3,20-dione when the latter is employed in the above procedure.

EXAMPLE XI

A solution of 200 mg. of 6-chloro-16α,17α-difluoromethylene 16β-methyl-19-norpregna-4,6-diene-3,20-dione in 32 ml. of anhydrous isopropanol and 25 mg. of sodium borohydride is stirred at room temperature for 15 hours. One-hundred milliliters of water are added, and the resulting suspension is extracted several times with ether. The ether phase is dried over sodium sulfate and evaporated to dryness under reduced pressure to yield 3β-hydroxy-6-chloro - 16α,17α - difluoromethylene-16β-methyl-19-norpregna-4,6-dien-20-one which may be further purified by recrystallization from ether.

By the same process the 3-keto pregnanes and 19-norpregnanes of the previous examples can be converted into the corresponding 3β-hydroxy pregnanes and 19-norpregnanes.

A mixture of 1 g. of 16α,17α-difluoromethylene-3β-hydroxy-6-chloro-19-norpregn-4,6-dien-20-one, 4 ml. of pyridine and 2 ml. of acetic anhydride is allowed to stand at room temperature for 15 hours. The mixture is then poured into ice water and the solid which forms is collected by filtration, washed with water and dried to yield 16α,17α - difluoromethylene - 3β-acetoxy-6-chloro-19-norpregn-4,5-dien-20-one which may be further purified through recrystallization from acetone:hexane.

Likewise, 3β-acetoxy-6-chloro-16α,17α-difluoromethylene-16β-methylpregn-4,6-dien-20-one; 3β-acetoxy-6α,16β-dimethyl - 16α,17α - difluoromethylenepregn-4-en-20-one, and the like, can be produced by the same process from the corresponding 3β-hydroxy steroid.

By replacing acetic anhydride with caproic anhydride, in the above process, the 3β-caproxy esters of the above compounds can be synthesized, e.g. 3β-caproxy-6-chloro-16α,17α-methylene-16β-methyl - 17α - acetoxypregn-4,6-dien-20-one.

EXAMPLE XII

Two milliliters of dihydropyran are added to a solution of 1 g. of 3β-hydroxy-6-chloro-16α,17α-difluoromethylene-16β-methyl-19-norpregna-4,6-dien-20-one in 15 ml. of benzene. About 1 ml. is removed by distillation to remove moisture and 0.4 g. of p-toluenesulfonyl chloride is added to the cooled solution. This mixture is allowed to stand at room temperature for 4 hours and is then washed with aqueous sodium carbonate solution and water, dried and evaporated. The residue is chromatographed on neutral alumina, eluting with hexane, to yield 3β - (tetrahydropyran-2-yloxy)-6-chloro-16α,17α-difluoromethylene-16β-methyl-19-norpregna-4,6-dien-20-one which is recrystallized from pentane.

In a similar fashion, the 3β-hydroxy compounds of Example XI can be generated into the corresponding 3β-tetrahydropyran-2-yl ether compounds.

By employing the same method, but utilizing dihydrofuran instead of dihydropyran, 3β - tetrahydrofuran-2-yloxy compounds can be produced from 3β-hydroxy compounds. Thus, from 3β-hydroxy-6-chloro-16α,17α-difluoromethylene-16β-methyl - 21 - fluoropregna-4,6-dien-20-one; 3β - (tetrahydrofuran-2-yloxy)-6-chloro-16α,17α-difluoromethylene - 16β-methyl-21-fluoropregna-4,6-dien-20-one can be obtained.

EXAMPLE XIII

A mixture of 2 g. of 3β-hydroxy-16α,17α-difluoromethylenepregna-4,6-diene-20-one and 4 ml. of adamantoyl chloride in 8 ml. of pyridine is heated at steam bath temperatures for one hour. The mixture is then poured into ice water and the solid which forms is collected by filtration, washed with water and dried to yield 3β-adamantoyloxy - 16α,17α-difluoromethylenepregna-4,6-dien-20-one which is further purified through recrystallization from methylene chloride:hexane.

What is claimed is:
1. A compound of the general formula:

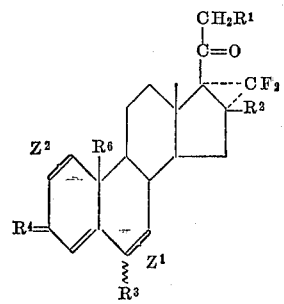

wherein each of
$Z^1$ and $Z^2$ is a carbon-carbon single bond or a carbon-carbon double bond;
$R^1$ is hydrogen or fluoro;
$R^2$ is hydrogen or methyl;
$R^3$ is hydrogen, 6α-methyl, 6α- or 6β-chloro, or 6α- or 6β-fluoro;
$R^4$ is oxygen or the group

where $R^5$ is hydroxy, a conventional hydrolyzable ester, tetrahydrofuran-2'-yloxy or tetrahydropyran-2'-yloxy; and
$R^6$ is hydrogen or methyl, $R^6$ being methyl when $Z^2$ is a carbon-carbon double bond.

2. The compounds according to claim 1 wherein $R^1$ is fluoro.

3. The compounds according to claim 1 wherein $R^2$ is methyl.

4. The compounds according to claim 1 wherein $R^3$ is chloro, fluoro or 6α-methyl.

5. The compounds according to claim 1 wherein
$R^1$ is hydrogen;
$R^3$ is hydrogen or chloro; and
$R^4$ is oxygen.

6. The compounds according to claim 5 wherein
$R^2$, $R^3$ and $R^6$ are hydrogen; and
$Z^1$ and $Z^2$ are carbon-carbon single bonds.

7. The compounds according to claim 5 wherein
$R^2$ and $R^3$ are hydrogen;
$R^6$ is methyl; and
$Z^1$ and $Z^2$ are carbon-carbon single bonds.

8. The compounds according to claim 5 wherein
$R^2$, $R^3$, and $R^6$ are hydrogen;
$Z^1$ is a carbon-carbon double bond; and
$Z^2$ is a carbon-carbon single bond.

9. The compounds according to claim 5 wherein

R² and R³ are hydrogen;
R⁶ is methyl;
Z¹ is a carbon-carbon double bond; and
Z² is a carbon-carbon single bond.
10. The compounds according to claim 5 wherein
R² and R³ are hydrogen;
R⁶ is methyl;
Z¹ is a carbon-carbon single bond; and
Z² is a carbon-carbon double bond.
11. The compounds according to claim 5 wherein
R² and R³ are hydrogen;
R⁶ is methyl; and
Z¹ and Z² are carbon-carbon double bonds.
12. The compounds according to claim 5 wherein
R² and R⁶ are hydrogen;
R³ is 6α-chloro; and
Z¹ and Z² are carbon-carbon single bonds.
13. The compounds according to claim 5 wherein
R² is hydrogen;
R³ is 6α-chloro;
R⁶ is methyl; and
Z¹ and Z² are carbon-carbon single bonds.
14. The compounds according to claim 5 wherein
R² and R⁶ are hydrogen;
R³ is chloro;
Z¹ is a carbon-carbon double bond; and
Z² is a carbon-carbon single bond.
15. The compounds according to claim 5 wherein
R² is methyl;
R³ is chloro;
R⁶ is hydrogen;
Z¹ is a carbon-carbon double bond; and
Z² is a carbon-carbon single bond.
16. The compounds according to claim 5 wherein
R² is hydrogen;
R³ is chloro;
R⁶ is methyl;
Z¹ is a carbon-carbon double bond; and
Z² is a carbon-carbon single bond.
17. The compounds according to claim 5 wherein
R² and R⁶ are methyl;
R³ is chloro;
Z¹ is a carbon-carbon double bond; and
Z² is a carbon-carbon single bond.
18. The compounds according to claim 5 wherein
R² is hydrogen;
R³ is 6α-chloro;
R⁶ is methyl;
Z¹ is a carbon-carbon single bond; and
Z² is a carbon-carbon double bond.
19. The compounds according to claim 5 wherein
R² is hydrogen;
R³ is chloro;
R⁶ is methyl; and
Z¹ and Z² are carbon-carbon double bonds.
20. The compounds according to claim 5 wherein
R² and R⁶ are methyl;
R³ is chloro; and
Z¹ and Z² are carbon-carbon double bonds.

References Cited

UNITED STATES PATENTS 3,232,961   2/1966   Kaspar et al. _____ 260—397.3

HENRY A. FRENCH, Primary Examiner

U.S. Cl. X.R.

260—239.5, 239.55, 397.4, 397.47, 999